Patented Aug. 29, 1933

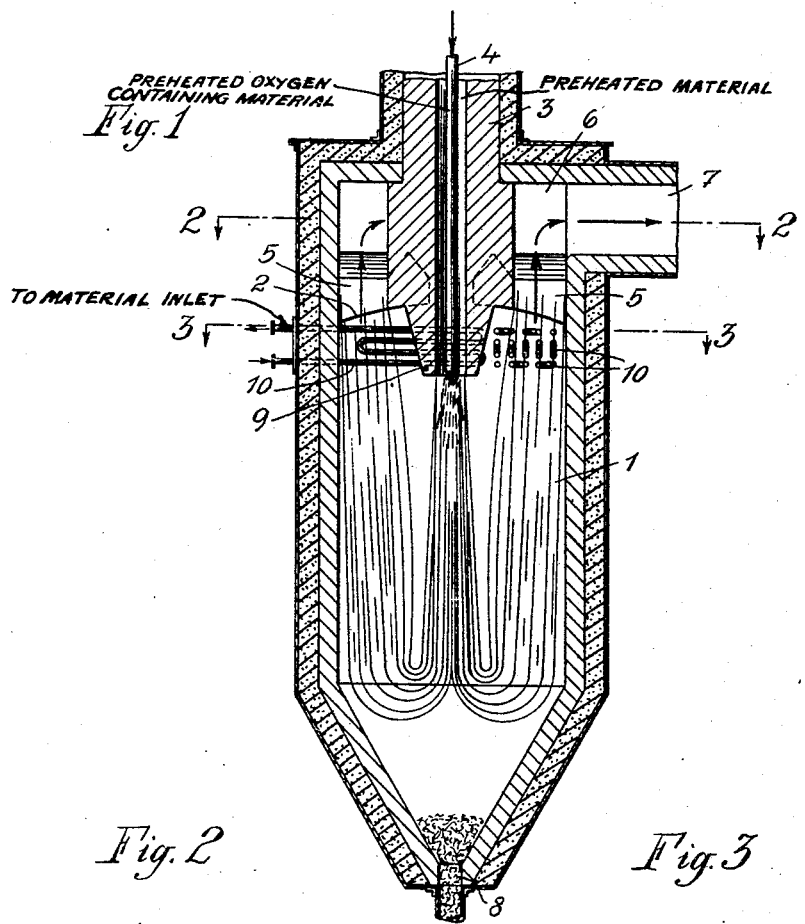
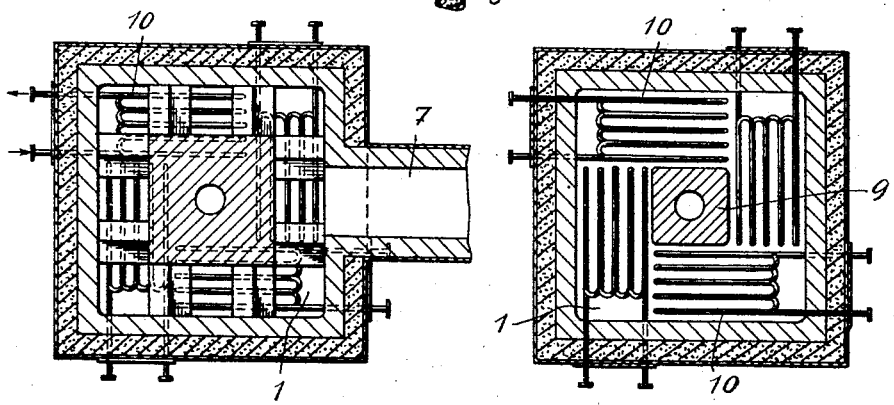

1,924,856

UNITED STATES PATENT OFFICE 1,924,856

CONTINUOUS GAS MANUFACTURE

Oswald Heller, Berlin, Germany

Application March 23, 1932, Serial No. 600,665, and in Germany February 7, 1931

3 Claims. (Cl. 48—206)

My invention relates to improvements in the method of and apparatus for producing gaseous mixtures from water gas, nitrogen or hydrogen, and carbon oxide, and the object of the improvements is to provide a method by means of which gaseous mixtures of uniform composition are obtained, and in which a waste of gas or valuable gaseous mixture is avoided. With this object in view my invention consists in providing a method in which the gases to be mixed are continuously combined.

For the purpose of explaining the invention an apparatus suitable for putting the method into effect has been illustrated in the accompanying drawing.

Fig. 1 is a vertical section through the said apparatus taken on the line 1—1 of Fig. 2.

Fig. 2 is a horizontal section on the line 2—2 of Fig. 1.

Fig. 3 is a horizontal section on the line 3—3 of Fig. 1.

In the example shown in the drawing the apparatus comprises a reaction chamber 1 which is rectangular in cross-section, and which is formed with a tapering bottom end, the wall of the said chamber being lined with refractory material. Through the top wall 2 of the reaction chamber a concentric pipe 3 is passed, and concentrically within the said pipe 3 a pipe 4 of smaller cross-section is located, the pipe 3 being used for supplying a mixture of gas, steam and powdered fuel, while the pipe 4 is used for supplying air or oxygen or a mixture of both. Concentrically around the pipes 3 and 4 a series of delivery openings 5 are provided which open into a passage 6 made in the top wall of the reaction chamber and connected with a delivery passage 7. The heating gas and fuel mixture and the oxygen or air or mixture of oxygen and air is introduced into the interior of the reaction chamber 1 by a mouthpiece 9 extending through the top 2 of the reaction chamber. By this means a rectangular space is created for the mixture in the top of the reaction chamber around the inlet mouth piece, in which space a steam superheater consisting of coiled pipes 10 of a well known kind is mounted. This steam superheater utilizes the heat of the hot gas escaping at a temperature of about 1000° C. for superheating steam. The steam thus generated can be again introduced into the process.

At the bottom end of the reaction chamber 1 there is an opening 8 through which ash may be removed from the chamber, the said opening being normally closed by a body of ash supported on the tapering wall of the chamber.

By means of the apparatus gaseous mixtures of water gas and nitrogen used for example in ammonia synthesis, or mixtures of hydrogen and carbon monoxide used for other purposes, are continuously produced by passing a mixture of water gas or double gas (that is, gas produced from coal which differs from the usual water gas in containing also the volatile ingredients of the coal) or illuminating gas such as for example the gas produced by the distillation of coal in vertical retorts and steam together with powdered fuel and air or pure oxygen into the reaction chamber and causing combustion of the mixture within the said chamber. The said components are supplied wholly or partly to the reaction chamber at highly elevated temperature, which is necessary for making use of the greater part of the heat developed by the combustion of the carbon into CO for transforming the steam and carbon into $H_2$ and CO. The temperature of the gases and the fuel corresponds to the reaction temperature of the water gas process. The oxygen of the air or pure oxygen enters into reaction with the combustible gas while developing much heat, so that the temperature of the mixture is raised, the product of the combustion in the first moment being steam and carbon dioxide. By reason of the said high temperature water gas is immediately energetically produced from the suspended powdered fuel and the steam, whereby the carbonic acid and the free carbon of the fuel dust are reduced to carbon monoxide. With the high temperatures prevailing close to the inlet point of the gas mixture all the hydrocarbons present in the mixture are decomposed into carbon and hydrogen, whereby the carbon thus set free reacts with the steam also to form water gas. Thereby the volume of the gas is increased, and simultaneously, by reason of the endothermic water gas process, the temperature is again reduced. Actually the combustion and the heat caused thereby and the water gas process which takes up the heat developed are carried out nearly simultaneously, so that the theoretical temperature of combustion is not attained. In lieu of air or pure oxygen I may use a mixture of air and oxygen.

The mixture of gas delivered through the pipes 3 and 4 into the reaction chamber is deflected upwardly in the bottom part of the said chamber, so that the downwardly directed gaseous mixture is surrounded on all sides by the upwardly flowing gas.

The highest temperature of about 1300–1500° Celsius is produced near the delivery ends of the pipes 3 and 4, and the said temperature is rapidly reduced by the water gas reaction, so that the upwardly directed part of the current of gas has a comparatively low temperature. Therefore the particles of ash, which at the point of highest temperature are probably in liquid state, are not brought into contact with the wall of the chamber, while the said ash is again solid or in the form of a powder when it is carried upwardly by the outer current of gas which is in contact with the wall of the chamber. Thereby deposition of the molten dust on the wall of the reaction chamber is prevented. Further, the inner current of gas which is at high temperature is insulated relatively to the wall of the reaction chamber so that loss of heat is reduced.

Preferably the method is carried out in such a way that the necessary mixture of water gas, steam and powdered fuel is taken directly, in a hot state, from a continuously operating system for generating water gas and operating with powdered fuel. In this case the mixture of water gas and steam and the necessary amount of combustible matter has a temperature of from about 600 to 1000° C., and it may be directly delivered into the reaction chamber for manufacturing the gaseous mixture. The air or oxygen may be heated in recuperative or regenerative apparatus.

By bringing the mixture of gas, steam and powdered fuel into contact with air or oxygen or a mixture of both only within the reaction chamber premature ignition of the gaseous mixture and interference with the reaction within the reaction chamber is avoided. This result is obtained by providing the separate pipes 3 and 4 axially of the reaction chamber and delivering the gases into the same in the same direction. Further, the relative arrangement of the intake pipes 3 and 4 and the delivery openings 5 has the result that the gaseous mixture delivered into the reaction chamber and burnt therein to high temperature is enveloped by the cooler gas which flows upwardly through the reaction chamber and the openings 5 into the annular chamber 6.

It will be understood that my invention is not limited to the construction shown in the figure. For example, the reaction chamber may be disposed horizontally.

The reacting substances can also enter from the bottom in upward jets and the products of the reaction can be withdrawn downwards.

Instead of a rectangular section the reaction chamber can also be given any other section, for example a circular or oval section.

I claim:

1. A continuous method of producing a combustible gas which comprises mixing steam, powdered carbonaceous fuel, and a substance of the group consisting of water gas, double gas, and illuminating gas, heating such mixture to substantially 1000° C., adding oxygen to such mixture, causing the substances to react, and removing the products of the reaction.

2. In a method as claimed in claim 1, the step of passing water or steam in heat exchange relation with the reaction products just prior to their removal and utilizing the resulting steam in the continued operation.

3. A continuous method of producing a combustible gas, which comprises mixing concentric downwardly directed jets of oxygen and a mixture of steam, powdered carbonaceous fuel, and a substance of the group consisting of water gas, double gas and illuminating gas, such mixture being heated to a temperature of substantially 600 to 1000° C., causing the substances to react, then directing the products of such reaction upward around the jets and contacting therewith, and conducting off such products of reaction at a point above the point of mixture of said jets.

OSWALD HELLER.